(12) United States Patent
Lopes Pereira et al.

(10) Patent No.: US 11,326,407 B2
(45) Date of Patent: May 10, 2022

(54) PREDICTING DOWNHOLE FLUID MIXING AND CHANNELING IN WELLBORES

(71) Applicant: Halliburton Energy Services, Inc., Houston, TX (US)

(72) Inventors: Vitor Lopes Pereira, The Woodlands, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 352 days.

(21) Appl. No.: 16/616,558

(22) PCT Filed: Dec. 31, 2018

(86) PCT No.: PCT/US2018/068138
§ 371 (c)(1),
(2) Date: Nov. 25, 2019

(87) PCT Pub. No.: WO2020/142064
PCT Pub. Date: Jul. 9, 2020

(65) Prior Publication Data
US 2021/0108472 A1 Apr. 15, 2021

(51) Int. Cl.
*E21B 21/08* (2006.01)
*E21B 47/00* (2012.01)
*G01V 99/00* (2009.01)

(52) U.S. Cl.
CPC .............. *E21B 21/08* (2013.01); *E21B 47/00* (2013.01); *G01V 99/005* (2013.01)

(58) Field of Classification Search
CPC .............................. G01V 99/005; E21B 21/08
See application file for complete search history.

(56) References Cited

U.S. PATENT DOCUMENTS

| 9,416,631 B2 | 8/2016 | Wu et al. |
| 2010/0076738 A1 | 3/2010 | Dean et al. |

(Continued)

FOREIGN PATENT DOCUMENTS

| CA | 2919059 A1 | 3/2015 |
| GB | 2335687 A | 9/1999 |

(Continued)

OTHER PUBLICATIONS

International Preliminary Report on Patentability issued in related PCT Application No. PCT/US2018/068138 dated Jul. 15, 2021, 7 pages.

(Continued)

*Primary Examiner* — Mischita L Henson
(74) *Attorney, Agent, or Firm* — Tenley Krueger; Baker Botts L.L.P.

(57) ABSTRACT

Effective prediction of downhole mixing and channeling at an interface between two or more wellbore fluids may prevent the unnecessary consumption of resources at a well site and enhance the performance of wellbore operations, including drilling operations, completion operations, and reservoir management. A model for a length and a volume of the interface between two wellbore fluids may be used to characterize the amount of mixing and channeling. The model may use known properties of the wellbore fluids before mixing and channeling occurs. The model may account for eccentricity in an annulus of the wellbore by partitioning a three dimensional flow profile in the wellbore into a plurality of segments for separate analysis. Outputs from the model may be used to determine one or more locations of the interface at one or more intervals of time as the wellbore fluids circulate through the wellbore. One or more compositions may be determined and recorded for one or more wellbore fluids at one or more depths of the (Continued)

wellbore during one or more intervals of time. To improve operational decision making at a well site, operators or automated processes may modify a wellbore operation based, at least in part, on the one or more compositions and the one dimensional model for mixing and channeling.

20 Claims, 7 Drawing Sheets

(56) References Cited

U.S. PATENT DOCUMENTS

| | | | |
|---|---|---|---|
| 2010/0082258 | A1 | 4/2010 | Wang |
| 2011/0192592 | A1* | 8/2011 | Roddy ............... E21B 47/005 166/250.01 |
| 2014/0367092 | A1* | 12/2014 | Roberson ............ E21B 47/01 166/250.01 |
| 2015/0066457 | A1 | 3/2015 | Wu et al. |
| 2018/0308034 | A1 | 10/2018 | Madasu et al. |
| 2018/0347321 | A1 | 12/2018 | Hamon et al. |
| 2021/0115761 | A1* | 4/2021 | Lopes Pereira ........ G05B 13/04 |

FOREIGN PATENT DOCUMENTS

| | | |
|---|---|---|
| GB | 2524788 A | 10/2015 |
| RU | 2386783 C2 | 4/2010 |
| WO | 00/73620 A1 | 12/2000 |
| WO | 2015/030863 A1 | 3/2015 |

OTHER PUBLICATIONS

International Search Report issued in related PCT Application No. PCT/US2018/068138 dated Sep. 26, 2019, 10 pages.
Ekambara, Kalekudithi, and J. B. Joshi. "Axial mixing in pipe flows: turbulent and transition regions." Chemical Engineering Science 58.12 (2003): 2715-2724.
Gibson Applied Technology and Engineering, Inc., "Axial Mixing in Pipe Displacement", Jul. 2012, 2 pages.
Sutherland, B. R., et al. "Interfacial Mixing in Viscous Pipe Flows Final report to Imperial Oil." (2000).
Enayatpour, Saeid, and Eric van Oort. "Advanced modeling of cement displacement complexities." SPE/IADC Drilling Conference and Exhibition. Society of Petroleum Engineers, 2017.
Jakobsen, J., et al. "Displacements in eccentric annuli during primary cementing in deviated wells." SPE Production Operations Symposium. Society of Petroleum Engineers, 1991.
Beirute, R. M., F. L. Sabins, and K. V. Ravi. "Large-scale experiments show proper hole conditioning: A critical requirement for successful cementing operations." SPE Annual Technical Conference and Exhibition. Society of Petroleum Engineers, 1991.
Smith, T. R., and K. M. Ravi. "Investigation of drilling fluid properties to maximize cement displacement efficiency." SPE Annual Technical Conference and Exhibition. Society of Petroleum Engineers, 1991.
Ravi, K. M., R. M. Beirute, and R. L. Covington. "Erodability of partially dehydrated gelled drilling fluid and filter cake." SPE Annual Technical Conference and Exhibition. Society of Petroleum Engineers, 1992.
Vefring, E. H., et al. "Optimization of displacement efficiency during primary cementing." Latin American and Caribbean Petroleum Engineering Conference. Society of Petroleum Engineers, 1997.
Biezen, Ewout, Niels van der Werff, and Kris Ravi. "Experimental and numerical study of drilling fluid removal from a horizontal wellbore." SPE annual technical conference and exhibition. Society of Petroleum Engineers, 2000.
Hemphill, T., and K. Ravi. "Pipe Rotation and Hole Cleaning in an Eccentric Annulus." IADC/SPE Drilling Conference. 2006.
Gorokhova, Lidia, Andrew J. Parry, and Nicolas C. Flamant. "Comparing soft-string and stiff-string methods used to compute casing centralization." SPE Drilling & Completion 29.01 (2014): 106-114.
Karbasforoushan, Hanieh, et al. "On the Instability of Cement-Fluid Interface and Fluid Mixing." SPE Deepwater Drilling and Completions Conference. Society of Petroleum Engineers, 2016.
Leach, S.J. "Stratification and Mixing of Fluids of Different Densities," 1968, 9 pages.
Alba, K., S. M. Taghavi, and I. A. Frigaard. "Miscible density-stable displacement flows in inclined tube." Physics of Fluids 24.12 (2012): 123102.
Liao, Jue. "Rayleigh-Taylor growth rate for arbitrary density profiles calculated with a variational method." Laboratory for Laser Energetics Summer High School Project Report (2002).

\* cited by examiner

PREDICTING DOWNHOLE FLUID MIXING AND CHANNELING IN WELLBORES

CROSS-REFERENCE TO RELATED APPLICATION

The present application is a U.S. National Stage Application of International Application No. PCT/US2018/068138 filed Dec. 31, 2018, which is incorporated herein by reference in its entirety for all purposes.

TECHNICAL FIELD

The present invention relates to methods for predicting mixing and channeling between the interface of two or more downhole fluids in a wellbore and, more particularly, to systems and methods for predicting fluid contamination and cleaning efficiency in wellbore fluids displacements.

BACKGROUND

The present invention relates generally to operations performed and equipment utilized in conjunction with a subterranean wellbore and, in an embodiment described herein, more particularly provides a method for predicting downhole spacer contamination during wellbore fluids displacement operations.

In a well system environment, multiple distinct fluids can exist in separate physical domains, for example, in separate parts of a flow path. In an intermediate region (e.g., at a fluid interface or mixing and channeling zone), the distinct fluids may coexist in a common domain. For example, interface mixing and channeling effects may generate an interface volume in the intermediate region with unknown characteristics. In one or more embodiments, one of the fluids displaces the other fluid within the flow path, causing the intermediate region to move along the flow path.

Understanding the degree to which interface mixing and channeling occurs is often advantageous in a well system environment, in both drilling and completion operations. For instance, contaminated fluids that result from interface mixing and channeling during a wellbore fluids displacement operation may detrimentally impact the overall cleaning efficiency of the operation. Accurately predicting the volume and concentration of mixing and/or channeling between different fluids is therefore pertinent to the design of an effective displacement operation.

However, modeling fluid mixing and channeling in a well system environment requires attention to numerous parameters, such as non-Newtonian flow, wellbore geometry (pipe eccentricity, diameters, hole trajectory), thermal gradients, wellbore lithology and stress state, downhole fluid properties, downhole filter cake properties, pump rates, the sequence of fluids, and pipe rotation effects. As a result, known-existing methodologies either take longer than operationally practical or are based on data mining that most often requires extrapolation over existing data boundaries. For instance, the long simulation times and convergence issues of existing models prevent timely calculations for wellbore fluids displacement operations, which uses a prolonged sequence of several fluids with varying properties and pump rates. Therefore, new methods and tools are required for the efficient modeling of fluid mixing and channeling.

Figure 1:
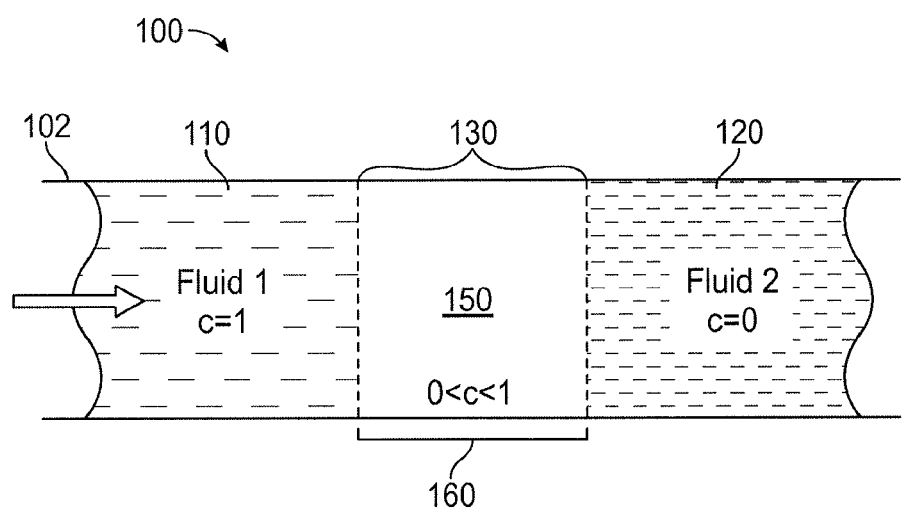
FIG. 1 is a diagram illustrating a mixing and channeling zone, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

In a well system environment, multiple distinct fluids can exist in separate physical domains, for example, in separate parts of a flow path. Mixing and channeling between fluid interfaces can generate pockets of contaminated fluids with unknown characteristics, which creates challenges during various wellbore operations. The following disclosure describes an embodiment for predicting mixing and channeling to optimize a wellbore fluids displacement operation in a wellbore servicing system.

Wellbore fluids displacement is defined as an operation used to displace one or more drilling fluids by circulating a second fluid through the wellbore. A wellbore fluids displacement operation is hereafter referred to as a "displacement operation." A displacement operation is considered successful if the one or more initial fluids and one or more solids are no longer present or detectable in the wellbore (or desired portions of the wellbore) at the end of the displacement operation. The present disclosure describes an embodiment that uses a displacement operation to clean the wellbore by removing residual unwanted substances from the wellbore. Proper removal of one or more residual oils, one or more solids or both is vital to the longevity of a wellbore because residue may hinder completion operations and damage a producing subterranean formation. A displacement operation is performed using a series of one or more wellbore servicing fluids, namely "pills," "spacers," or both, which provide both chemical and mechanical cleaning. One or more pills, one or more spacers or both with one or more individual functions are circulated through the wellbore in a sequence known as a displacement train.

A displacement operation is constrained by various factors, including, but not limited to, environmental regulations, operational restrictions, and the risk of wellbore damage. Therefore, planning, designing, and executing a displacement operation requires rigorous adherence to detailed steps and best practices in order to achieve thorough cleaning efficiency. Design selection and operation modeling for displacement operations require detailed consideration of data of fluids involved in the displacement process. One or more suitable cleaning additives, as well as properties associated with the one or more suitable cleaning additives, one or more concentrations, one or more volumes, one or more flow rates, and one or more pipe rotations (which are used to generate a sufficient fluid shear stress on the wellbore) are determined by one or more factors. The one or more factors may comprise one or more initial fluid types, one or more final fluid types, one or more initial fluid properties, one or more final fluid properties, one or more fluid losses to formation, a downhole pressure, a downhole temperature, differential pressure into the formation, one or more shutdown periods, a drilling history, a wellbore geometry, one or more rig capabilities, one or more downhole properties of one or more fluid deposits, and any combination thereof.

Poor design of a displacement operation may create unnecessary burdens for logistics and rig resources. For example, additional displacement operations may be required to rectify a poorly executed displacement operation. During the planning phase of a displacement operation, a volume, one or more properties, a chemistry, a concentration, and a flow regime of one or more fluids are carefully designed to consider the individual role of each pill, spacer or both in the displacement operation. Any one or more of a mechanical component, a chemical component, and a hydraulic component play a vital role in the displacement operation. Optimal design maximizes the cleaning efficiency of a displacement operation, which requires attention to mechanical removal of cuttings, as well as both the chemical and mechanical removal of one or more gelled fluids, one or more filter cakes, and any combination thereof. Designers may also modify a volume, one or more properties, a chemistry, a concentration, a flow regime, and combination thereof of a fluid to accommodate the individual purpose of each pill, each spacer, or both.

Mixing and channeling effects that occur at the interface between two or more fluids can detrimentally impact the overall cleaning efficiency of a displacement train. Many factors dictate the level of interaction between the fluid interfaces, such as one or more flow path geometries, one or more operational conditions, one or more fluid volumes, and one or more fluid properties. For instance, flow path geometry is governed by one or more lengths, one or more annular gaps, one or more pipe geometries, and one or more wellbore orientations (for example, horizontal, vertical, slant, curved, other wellbore orientations, and any combination thereof). Operational conditions include one or more temperatures, one or more pressures, one or more pipe rotations, one or more flow paths, and one or more pump schedules. Fluid volumes and properties must account for one or more densities, one or more rheologies, one or more miscibilities, one or more surface tensions, other properties, and any combination thereof.

To facilitate a better understanding of the present invention, the following examples of certain embodiments are given. In no way should the following examples be read to limit, or define, the scope of the invention. One or more embodiments of the present disclosure may be applicable to any type of drilling operation including, but not limited to, exploration, services or production operation for any type of well site or reservoir environment including subsurface and subsea environments.

Although the following disclosure concentrates on wellbore servicing fluids used in displacement operations (for instance, pill fluids and spacer fluids), the methods and tools can be extended for use in other contexts as well. For example, wellbore servicing fluids can be used in a variety of subterranean operations, including stimulation treatments, conformance treatments, lost circulation treatments, hydraulic fracturing treatments, acidizing treatments, remediation treatments, scale removal treatments, scale inhibition treatments, and the like. Use of these terms herein does not imply any particular action by the fluid or any particular component thereof.

As used herein, the term "flow path" refers to a route through which any fluid is capable of being transported between at least two points. In one or more embodiments, the flow path need not be continuous or otherwise contiguous between the two points. Exemplary flow paths comprise, but are not limited to, a flow line, a pipeline, production tubing, drill string, work string, casing, a wellbore, an annulus defined between a wellbore and any tubular arranged within the wellbore, a mud pit, a subterranean formation, any other suitable flow path, combinations thereof, or the like. The term "flow path" does not necessarily imply that a fluid is flowing therein; rather, a fluid is capable of being transported or otherwise flowable therethrough.

According to one or more aspects of the present disclosure, an information handling system or computer equipment may be required. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For example, referring now to FIG. 1, illustrated is a schematic diagram 100 of miscible fluid displacement in a fluid channel 102, according to one or more aspects of the present invention. FIG. 1 depicts a first fluid 110 displacing a second fluid 120 in a fluid channel 102. In one or more embodiments, the first fluid 110 may comprise any one or more fluids and the second fluid 120 may comprise any one or more other fluids. In one or more embodiments, any one or more first fluids 110 may be the same as or similar to any one or more second fluids 120. In FIG. 1, the first fluid 110 and the second fluid 120 may be miscible fluids with one or more distinct physical properties. For example, the first fluid 110 may comprise or may be described or distinguished by a viscosity $\mu_1$ and a density $\rho_1$ and second fluid 120 may comprise or may be described or distinguished by a viscosity $\mu_2$ and a density $\rho_2$, where $\rho_1 \neq \mu_2$ or $\rho_1 \neq \rho_2$. The region between the first fluid 110 and the second fluid 120, where the first fluid 110 and the second fluid 120 interact and mix, may be described as a mixing and channeling zone 130. The mixing and channeling zone 130 is the region where at least a portion of both the first fluid 110 and the second fluid 120 is present. The composite fluid 150 present in the mixing and channeling zone 130 may be a composition of at least a portion of both the first fluid 110 and second fluid 120. In one or more embodiments, interface length 160 is a length of the mixing and channeling zone 130. At any one or more time intervals, mixing and channeling zone 130 comprises a volume of composite fluid 150 referred to as an interface volume. In a displacement operation, mixing between the first fluid 110 and the second fluid 120 may be undesirable, for instance, because the composite fluid 150 may have diminished cleaning capabilities.

Figure 2:
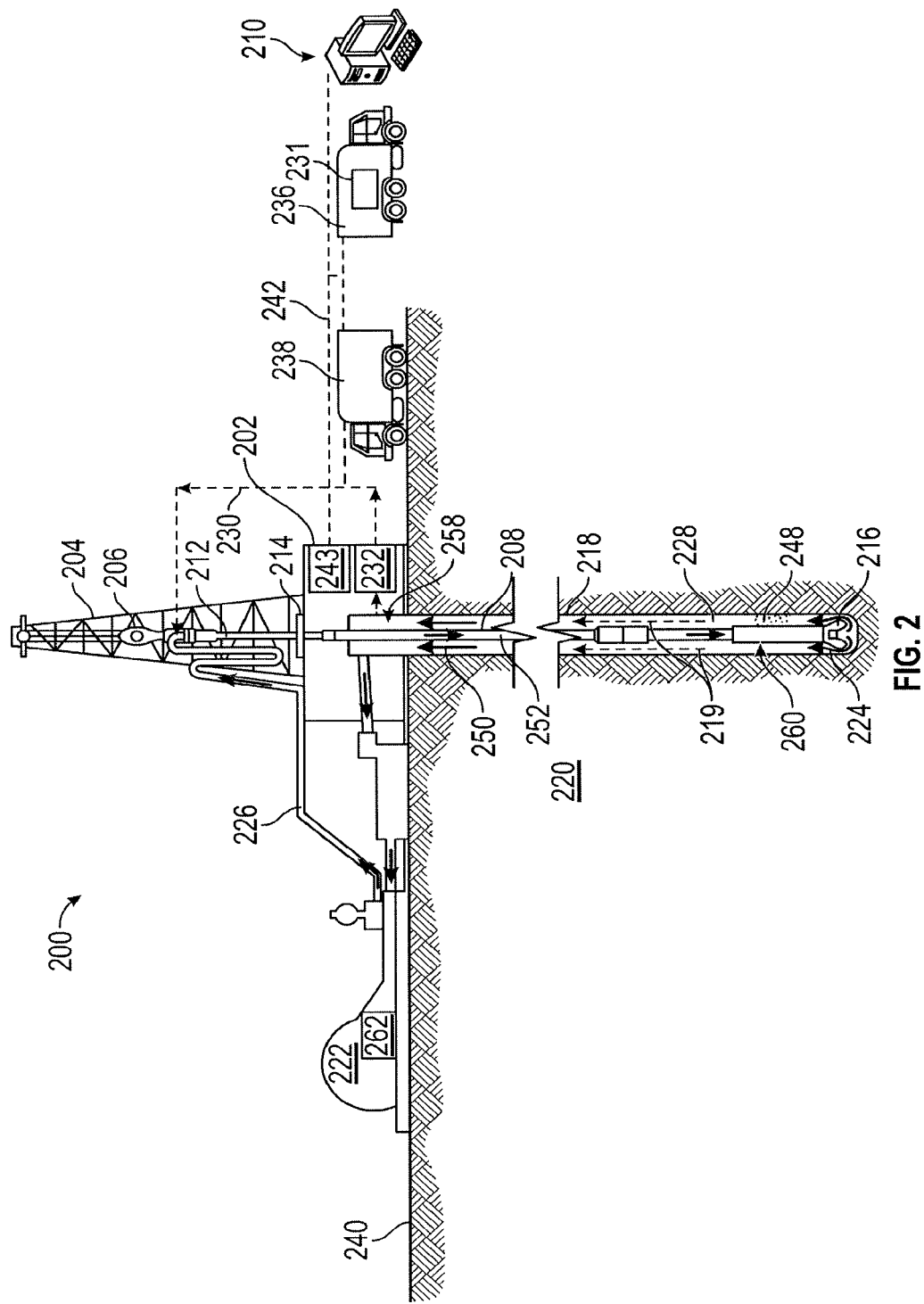
FIG. 2 is a schematic diagram of a wellbore servicing system, according to one or more aspects of the present disclosure.

FIG. 2 illustrates a wellbore servicing system 200 and wellbore monitoring system 210 that may employ one or more of methods described herein in order to predict downhole fluid contamination or identify one or more fluids, according to one or more embodiments. The example wellbore servicing system 200 comprises a drilling platform 202 that supports a derrick 204 having a traveling block 206 for raising and lowering a drill string 208. A kelly 212 supports the drill string 208 as it is lowered through a rotary table 214. A drill bit 216 is attached to the distal end of the drill string 208 and is driven either by a downhole motor and/or via rotation of the drill string 208 from the well surface. As the bit 216 rotates, it creates a wellbore 218 that penetrates various subterranean formations 220. The example wellbore 218 shown in FIG. 2 comprises a vertical wellbore. However, a wellbore servicing system 200 may comprise any combination of horizontal, vertical, slant, curved, or other wellbore orientations.

A pump 222 (for example, a mud pump) circulates wellbore servicing fluid 224 through a feed pipe 226 and to the kelly 212, which conveys the wellbore servicing fluid 224 downhole through an interior conduit 252 defined in the drill string 208 and through one or more orifices in the drill bit 216. The wellbore servicing fluid 224 is then circulated back to the surface via an annulus 228 defined between the drill string 208 and the walls of the wellbore 218. The route through which wellbore servicing fluid 224 circulates may be described using one or more fluid flow paths 219. In one or more embodiments, operation of wellbore servicing system 200 may comprise diverting wellbore servicing fluid 224 to fluid reclamation equipment 232 and optimizing associated fluid reclamation equipment 232.

The wellbore servicing fluid 224 may carry out several functions, such as the mechanical and chemical removal of one or more fluid deposits from wellbore walls, and the mechanical removal of cuttings and solids. The wellbore servicing fluid 224 may be any wellbore clean-up or completion fluid known to those skilled in the art. In one or more embodiments, for example, the wellbore servicing fluid 224 may be water, such as a brine or the like, or one or more spacer fluids known to those skilled in the art. The wellbore servicing fluid 224 may be, but is not limited to, municipal treated or fresh water, sea water, salt water (for example, water containing one or more salts dissolved therein) naturally-occurring brine, a chloride-based, bromide-based, or formate-based brine containing monovalent and/or polyvalent cations, aqueous solutions, non-aqueous solutions, base oils, and any combination thereof. Examples of chloride-based brines comprise sodium chloride and calcium chloride. Examples of bromide-based brines comprise sodium bromide, calcium bromide, and zinc bromide. Examples of formate-based brines comprise sodium formate, potassium formate, and cesium formate. To those of ordinary skill in the art, one or more types of wellbore servicing fluid 224 may be referred to as a "pill" or a "spacer."

Wellbore servicing fluid 224 may be conveyed or otherwise introduced into the wellbore 218 at predetermined intervals of time in order to, among other things, clean up the wellbore 218 and displace one or more existing fluids 250 from the wellbore 218. For example, in a displacement operation, the wellbore servicing fluid 224 may be circulated through the wellbore 218 along one or more fluid flow paths 219 in order to flush the existing fluids 250 and residual substances 248 out of the wellbore 218. For instance, the wellbore servicing fluid 224 may be circulated through the wellbore 218 at the end of a drilling operation in order to perform a displacement operation of the wellbore 218 in preparation for hydrocarbon production. The displacement of existing fluids 250 by wellbore servicing fluid 224 may comprise miscible fluid displacement, as shown in FIG. 1. Miscible fluid displacement results in a composite fluid 150 comprising wellbore servicing fluid 224 and existing fluid 250.

In one or more embodiments, upon returning to the surface and exiting the wellbore 218, the wellbore servicing fluid 224 may be conveyed to one or more servicing fluid reclamation equipment 232 fluidly coupled to the annulus 228. The reclamation equipment 232 may be configured to receive and rehabilitate the wellbore servicing fluid 224 in preparation for its reintroduction into the wellbore 218, if desired. The reclamation equipment 232 may comprise one or more filters or separation devices configured to clean the wellbore servicing fluid 224. In at least one embodiment, the reclamation equipment 232 may comprise a diatomaceous earth filter, or the like.

In one or more embodiments, wellbore servicing system 200 comprises one or more instrument trucks 236, one or more pump trucks 238, and a wellbore servicing fluid control subsystem 231. The wellbore servicing system 200 may perform one or more displacement operations that comprise, for example, a multi-stage displacement operation, a single-stage displacement operation, a final displacement operation, other types of displacement operations, or a combination of these. For example, a displacement operation may circulate one or more wellbore servicing fluids 224 (for example, one or more pills, one or more spacers, any combination thereof) over a single time period or a plurality of time periods. The circulation of a plurality of wellbore servicing fluids 224 in sequential order forms a "displacement train." Moreover, the wellbore servicing system 200 can circulate fluid through any suitable type of wellbore, such as, for example, vertical wellbores, slant wellbores, horizontal wellbores, curved wellbores, or combinations of these and others.

The one or more pump trucks 238 may comprise any one or more of one or more mobile vehicles, one or more immobile installations, one or more skids, one or more hoses, one or more tubes, one or more fluid tanks, one or more fluid reservoirs, one or more pumps, one or more valves, one or more mixers, or any other one or more types of structures and equipment. The one or more pump trucks 238 shown in FIG. 2 can supply wellbore servicing fluid 224 or other materials for the displacement operation. The one or more pump trucks 238 may convey the wellbore servicing fluid 224 downhole through the interior conduit 252 defined in the drill string 208 and through one or more orifices in the drill bit 216.

The one or more instrument trucks 236 may comprise mobile vehicles, immobile installations, or other structures. The one or more instrument trucks 236 shown in FIG. 2 comprise a wellbore servicing fluid control subsystem 231 that controls or monitors the displacement operation applied by the wellbore servicing system 200. One or more communication links 242 may communicatively couple the one or more instrument trucks 236 to the one or more pump trucks 238, or other equipment at a ground surface 240. In one or more embodiments, the one or more communication links 242 may communicatively couple the one or more instrument trucks 236 to one or more controllers 243 disposed at or about the wellbore, one or more sensors (such as surface sensors 258 and downhole sensors 260), other one or more data collection apparatus in the wellbore servicing system 200, remote systems, other well systems, any equipment installed in the wellbore 218, other devices and equipment, or a combination thereof. In one or more embodiments, the one or more communication links communicatively couple the one or more instrument trucks 236 to the wellbore monitoring system 210, which may run one or more simulations and record simulation data. The wellbore servicing system 200 may comprise a plurality of uncoupled communication links 242 or a network of coupled communication links 242. The communication links 242 may comprise direct or indirect, wired or wireless communications systems, or combinations thereof.

The wellbore servicing system 200 may also comprise one or more surface sensors 258 and one or more downhole sensors 260 to measure a pressure, a rate, a temperature, and any other parameters of displacement operations. For example, the surface sensors 258 and downhole sensors 260 may comprise meters or other equipment that measure properties of one or more fluids in the wellbore 218 at or near the ground surface 240 level or at other locations. The wellbore servicing system 200 may comprise one or more pump controls 262 or other types of controls for starting, stopping, increasing, decreasing or otherwise controlling pumping as well as controls for selecting or otherwise controlling fluids pumped during the displacement operation. The wellbore servicing fluid control subsystem 231 may communicate with the one or more of one or more surface sensors 258, one or more downhole sensors 260, one or more pump controls 262, and other equipment to monitor and control the displacement operation.

The wellbore monitoring system 210 may comprise one or more information handling systems (such as the information handling system represented in FIG. 3) located at the wellbore 218 or any one or more other locations. The wellbore monitoring system 210 or any one or more components of the wellbore monitoring system 210 may be located remote from any one or more of the other components shown in FIG. 2. For example, the wellbore monitoring system 210 may be located at a data processing center, a computing facility, or another suitable location. The wellbore servicing system 200 may comprise additional or different features, and the features of the wellbore servicing system 200 may be arranged as shown in FIG. 2 or in another configuration.

In one or more embodiments, the wellbore servicing fluid control subsystem 231 shown in FIG. 2 controls operation of the wellbore servicing system 200. The wellbore servicing fluid control subsystem 231 may comprise one or more data processing equipment, one or more communication equipment, or other systems that control the circulation of wellbore servicing fluids through the wellbore 218. The wellbore servicing fluid control subsystem 231 may be communicatively linked or communicatively coupled to the wellbore monitoring system 210, which may calculate, select, or optimize displacement operation parameters. The wellbore servicing fluid control subsystem 231 may receive, generate or modify a displacement operation plan (for example, a pumping schedule or displacement train) that specifies parameters of a displacement operation to be applied to the wellbore 218.

In one or more embodiments, the wellbore monitoring system 210 may simulate wellbore hydraulics in the wellbore servicing system 200. For example, the wellbore monitoring system 210 may comprise one or more flow models for simulating fluid flow in or between various locations of fluid flow in the well system, such as, for example, the wellbore 218, the drill string 208, any other components, and any combination thereof. The one or more flow models may also model the flow of miscible fluids, immiscible fluids, or composite fluids comprised of a plurality of fluids. In one or more embodiments, the one or more flow models may model flow in one, two, or three spatial dimensions. The one or more flow models may comprise nonlinear systems of differential or partial differential equations. The wellbore monitoring system 210 may generate a plurality of nodes or a mesh for use in the one or more flow models or simulations. The wellbore monitoring system 210 can use the flow models to predict, describe, or otherwise analyze the dynamic behavior of fluid in the wellbore servicing system 200.

The wellbore monitoring system 210 may perform one or more simulations before, during, or after the displacement operation. In one or more embodiments, the wellbore servicing fluid control subsystem 231 controls the displacement operation based on one or more simulations performed by the wellbore monitoring system 210. For example, a pumping schedule or one or more other aspects of the displacement operation may be generated in advance based on one or more simulations performed by the wellbore monitoring system 210. As another example, the wellbore servicing fluid control subsystem 231 may modify, update, or generate a displacement operation based on one or more simulations performed by the wellbore monitoring system 210 in real time during the displacement operation.

In one or more embodiments, the one or more simulations are based on data obtained from the wellbore servicing system 200. For example, one or more pressure meters, one or more flow monitors, one or more microseismic equipment, one or more tiltmeters, or other equipment can perform measurements before, during, or after a displacement operation; and the wellbore monitoring system 210 may simulate wellbore hydraulics based on the measured data. In one or more embodiments, the wellbore servicing fluid control subsystem 231 may select or modify (for example, increase or decrease) one or more pressures of the wellbore servicing fluid 224, one or more densities of the wellbore servicing fluid 224, one or more viscosities of the wellbore servicing fluid 224, one or more compositions of the wellbore servicing fluid 224, and one or more other control parameters based on data provided by the one or more simulations. In one or more embodiments, data provided by the one or more simulations may be displayed in real time during the displacement operation, for example, to an engineer or other operator of the wellbore servicing system 200.

In one or more embodiments, the techniques and operations described herein may be implemented by one or more information handling systems configured to provide the functionality described. In various instances, a computing system may comprise any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 3:
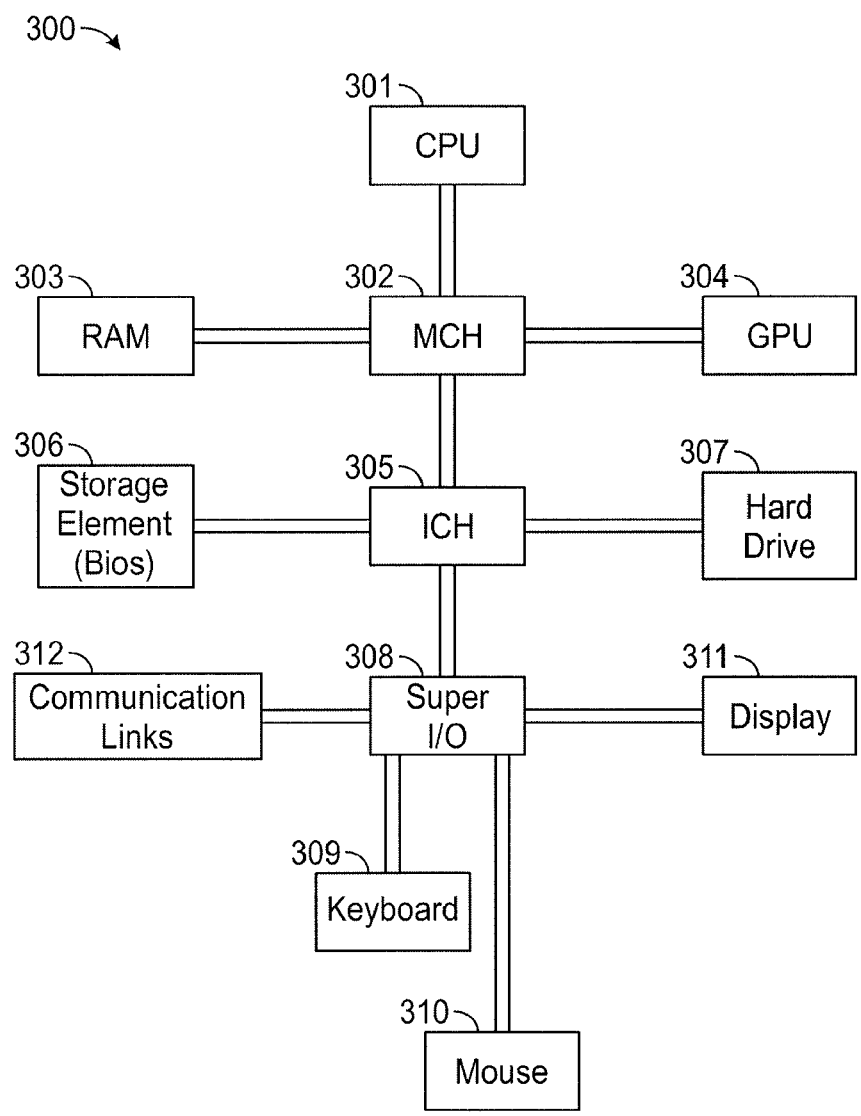
FIG. 3 is a diagram illustrating an information handling system, according to one or more aspects of the present disclosure.

FIG. 3 is a diagram illustrating an example information handling system 300, according to one or more aspects of the present disclosure. The wellbore monitoring system 210 in FIG. 2 may take a form similar to the information handling system 300 or include one or more components of information handling system 300. A processor or central processing unit (CPU) 301 of the information handling system 300 is communicatively coupled to a memory controller hub (MCH) or north bridge 302. The processor 301 may include, for example a microprocessor, microcontroller, digital signal processor (DSP), application specific integrated circuit (ASIC), or any other digital or analog circuitry configured to interpret and/or execute program instructions and/or process data. Processor 301 may be configured to interpret and/or execute program instructions or other data retrieved and stored in any memory such as memory 303 or hard drive 307. Program instructions or other data may constitute portions of a software or application for carrying out one or more methods described herein. Memory 303 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 303, for example, a non-transitory memory, for execution by processor 301.

Modifications, additions, or omissions may be made to FIG. 3 without departing from the scope of the present disclosure. For example, FIG. 3 shows a particular configuration of components of information handling system 300. However, any suitable configurations of components may be used. For example, components of information handling system 300 may be implemented either as physical or logical components. Furthermore, in one or more embodiments, functionality associated with components of information handling system 300 may be implemented in special purpose circuits or components. In other embodiments, functionality associated with components of information handling system 300 may be implemented in configurable general purpose circuit or components. For example, components of information handling system 300 may be implemented by configured computer program instructions.

Memory controller hub 302 may include a memory controller for directing information to or from various system memory components within the information handling system 300, such as memory 303, storage element 306, and hard drive 307. The Memory controller hub 302 may be coupled to memory 303 and a graphics processing unit (GPU) 304. Memory controller hub 302 may also be coupled to an I/O controller hub (ICH) or south bridge 305. I/O controller hub 305 is coupled to storage elements of the information handling system 300, including a storage element 306, which may comprise a flash ROM that includes a basic input/output system (BIOS) of the computer system. I/O controller hub 305 is also coupled to the hard drive 307 of the information handling system 300. I/O controller hub 305 may also be coupled to a Super I/O chip 308, which is itself coupled to several of the I/O ports of the computer system, including keyboard 309 and mouse 310, display 311.

In one or more embodiments, Super I/O chip 308 may be coupled to one or more communication links 312, which may comprise any type of communication channel, connector, data communication network, serial link, a wireless link (for example, infrared, radio frequency, or others), a parallel link, other types of links, and any combination thereof. For example, the communication link 312 may comprise a wireless or a wired network, a Local Area Network (LAN), a Wide Area Network (WAN), a private network, a public network (such as the Internet), a Wi-Fi network, a network that includes a satellite link, or another type of data communication network. The communication link 312 may communicate with the one or more communication links 242.

In one or more embodiments, the wellbore monitoring system 210 may comprise an information handling system 300 with at least a processor and a memory device coupled to the processor that contains one or more instructions that when executed cause the processor to perform one or more actions. In any embodiment, the information handling system may include a non-transitory computer readable medium that stores one or more instructions where the one or more instructions when executed cause the processor to perform one or more actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 4:
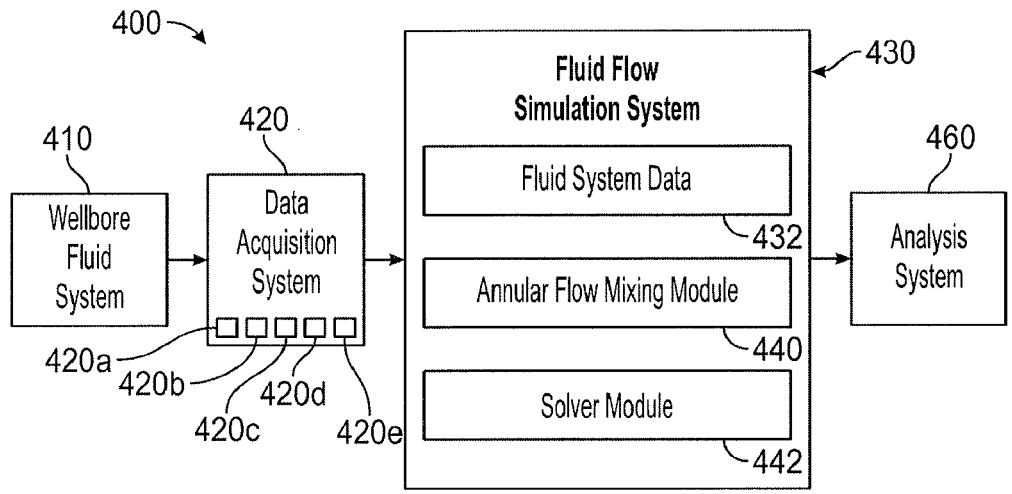
FIG. 4 is a diagram of wellbore fluid analysis system, according to one or more aspects of the present disclosure.

FIG. 4 is a diagram of wellbore fluid analysis system 400. The wellbore fluid analysis system 400 may be used to model physical phenomena related to a wellbore servicing system. For example, the architecture 400 may be used to model one or more fluid flow paths 219 for wellbore 218 as shown in FIG. 2. In one or more embodiments, wellbore analysis system 400 may comprise an information handling system 300 of FIG. 3. In one or more embodiments, the wellbore analysis system 400 models one or more fluid flow paths, one or more other aspects of a displacement operation, one or more other operations or activities, and any combination thereof. In one or more embodiments, the wellbore analysis system 400 models wellbore hydraulics associated with one or more components or elements of, for example, a wellbore servicing system 200. For example, the one or more components or elements may comprise any one or more of wellbores 218, wellbore conduits, wellbore perforations, reservoir rock media, reservoir fractures (for example, one or more fractures in a fracture network, in a dominant bi-wing fracture extending from a wellbore, in a natural complex fracture network, in hydraulically-induced fractures, and any combination thereof), or combinations of these and other types of fluid flow paths in a wellbore. The one or more components or elements may also comprise, for example, one or more properties of a residual substance in the wellbore (for example, residual substances 248 in FIG. 2). In one or more embodiments, the wellbore hydraulics may be modelled within, between or both of any of the one or more components or elements.

The wellbore fluid analysis system 400 shown in FIG. 4 comprises a wellbore fluid system 410, a data acquisition system 420, a fluid flow simulation system 430, and an analysis system 460. The wellbore fluid analysis system 400 may comprise additional or different components or subsystems, and the example components shown in FIG. 4 may be combined, integrated, divided, or configured in another manner. For example, the fluid flow simulation system 430 and the analysis system 460 may be subcomponents of an integrated computing system (for example, the wellbore monitoring system 210 shown in FIG. 2) or a plurality of information handling systems; or the data acquisition system 420 can he integrated with the wellbore fluid system 410. In one or more embodiments, the fluid flow simulation system 430 or the analysis system 460, or both, may be implemented in an information handling system (for example, information handling system 300 of FIG. 3) that operates independent of the wellbore fluid system 410 or the data acquisition system 420.

In one or more embodiments, the wellbore fluid system 410 may comprise any physical system where fluid flow or other fluid phenomena occur. The wellbore fluid system 410 may be, for example, the wellbore servicing system 200 shown in FIG. 2, or a subset of well system components or subsystems (for example, the wellbore 218 shown in FIG. 2). The wellbore fluid system 410 may comprise the physical reservoir rock in a subterranean reservoir (for example, the subterranean region 204 shown in FIG. 2), fractures or a fracture network in the reservoir rock, one or more downhole systems installed in a wellbore, or a combination of them.

The data acquisition system 420 may comprise one or more systems or hardware that obtain data from the wellbore fluid system 410. For example, the data acquisition system 420 may comprise one or more flow sensors 420a, one or more pressure sensors 420b, one or more temperature sensors 420c, any other types of measurement devices, and any combination thereof. The data acquisition system 420 may comprise one or more communication systems 420d and one or more data storage systems 420e that store, transfer, manipulate, or otherwise manage the information obtained from the wellbore fluid system 410.

The fluid flow simulation system 430 may comprise one or more information handling systems or computer-implemented programs that simulate fluid flow paths 219 in the wellbore 218, for example, information handling system 300 of FIG. 3. The fluid flow simulation system 430 may receive data related to the wellbore fluid system 410 and simulate fluid flow and other fluid phenomena that occur in the wellbore fluid system 410 based, at least in part, on the received information. For example, the fluid flow simulation system 430 may calculate or determine one or more flow velocities, one or more pressures, one or more fluid concentrations, any other aspects of fluid flow based on information from the data acquisition system 420 or another source and any combination thereof. In one or more embodiments, the fluid flow simulation system 430 receives data associated with wellbore servicing fluids 224, such as first fluid 110 and second fluid 120 in a displacement operation, other wellbore servicing fluids, and a combination thereof.

In one or more embodiments, the fluid flow simulation system 430 comprises fluid system data 432, an annular flow mixing module 440, and a solver 442. The fluid flow simulation system 430 may comprise additional or different features, and the features of a fluid flow simulation system 430 may be configured to operate in another manner. The modules of the fluid flow simulation system 430 (for example, annular flow mixing module 440, solver 442, or others) may comprise one or more hardware modules, one or more software modules, any one or more other types of modules and any combination thereof. In one or more embodiments, the modules 432, 440, and 442 may be integrated with each other or with other system components.

In one or more embodiments, the fluid flow simulation system 430 may be implemented as software or an application comprising one or more instructions stored in a memory and executed by a processor of an information handling system, for example, information handling system 300 of FIG. 3, and the one or more models and modules 432, 440, and 442 of the fluid flow simulation system 430 may be implemented as software functions or routines that are executed by the information handling system.

The fluid system data 432 may comprise any information related to the wellbore fluid system 410, any wellbore servicing fluids 224 within the wellbore fluid system 410, any other fluids, and any combination thereof. For example, the fluid system data 432 may be indicative of one or more physical properties (for example, a geometry, one or more cross-sectional areas, one or more surface properties, any other physical property, and any other combination thereof) associated with the wellbore fluid system 410, properties of the residual substances 248 within the wellbore 218, thermodynamic data (for example, one or more fluid pressures, one or more fluid temperatures, one or more fluid flow rates, or other data) measured at one or more locations in the wellbore fluid system 410, and other types of information. The fluid system data 432 may comprise information received from the data acquisition system 420, one or more other sources or both.

As shown in FIG. 4, the fluid flow simulation system 430 may comprise an annular flow mixing module 440. The annular flow mixing module 440 may comprise any information or modules that may be used to model the mixing between the interface of two or more fluids in fluid flow path 219. In one or more embodiments, the annular flow mixing module 440 may model a volume and a location of a composite fluid 150 comprising the first fluid 110 and second fluid 120 in a fluid channel 102. For example, the annular flow mixing module 440 may model at least one of an interface length 160 and an interface volume in a displacement operation that uses wellbore servicing fluid 224 as first fluid 110 and existing fluid 250 as second fluid 120. The annular flow mixing module 440 may comprise one or more one-dimensional models described with respect to FIGS. 6-9, or the annular flow mixing module 440 may use another type of flow model.

The solver module 442 may comprise any information or one or more modules that may be used to solve a system of equations. For example, the solver module 442 may be a direct solver or another type of solver. In one or more embodiments, the solver module 442 receives one or more inputs from one or more other components of the fluid flow simulation system 430. For example, the one or more inputs may comprise an information from any one or more of the annular cleaning efficiency module 440, the fluid system data 432, any other information, and any combination thereof. The one or more inputs may comprise data generated or reported from a separate simulation or model. The solver module 442 may generate a numerical result for a variable of interest based on the one or more inputs. The result may be generated for one or more of the grid points in a discretized spatial domain. For example, the solver module 442 may calculate a value of one or more fluid velocities, one or more fluid pressures, one or more fluid concentrations, or other variables over a spatial domain; the values may be calculated for an individual time step or a plurality of time steps.

The analysis system 460 may comprise any one or more of one or more systems, one or more components, one or more modules and any combination thereof that analyze, process, use, or access the simulation data generated by the fluid flow simulation system 430. For example, the analysis system 460 may be a real time analysis system that displays or otherwise presents wellbore data (such as, displaying on a display 311) to a field engineer, an operator, any other personnel and any combination thereof) during a wellbore servicing treatment. In one or more embodiments, the analysis system 460 may comprise any other one or more simulators, a simulation manager or both that use the fluid simulation data to simulate other aspects of a wellbore. For example, the analysis system 460 may be a displacement operation simulation suite of one or more applications that simulates amount of existing fluid 250 in a wellbore 218 displaced by a particular wellbore servicing fluid 224, based on simulated wellbore hydraulics data generated by the fluid flow simulation system 430.

Figure 5:
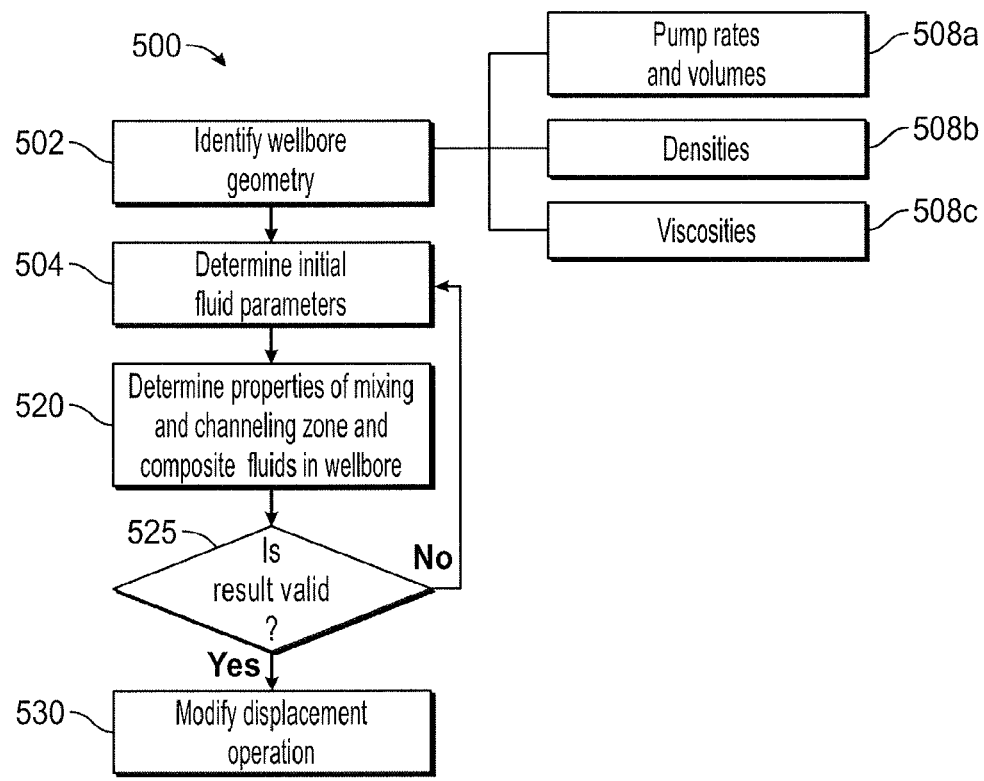
FIG. 5 is a flow chart for predicting downhole fluid mixing and channeling in a wellbore servicing system, according to one or more aspects of the present disclosure.

FIG. 5 is a flow chart of process 500 for predicting downhole fluid mixing and channeling in a wellbore 218. In one or more embodiments, an information handling system 300, for example, wellbore monitoring system 210 shown in FIG. 2, may implement any one or more steps of process 500. The process 500, one or more individual operations of the process 500, or groups of operations may be iterated or performed in parallel, in series, or in another manner. In one or more embodiments, the process 500 may comprise the same, additional, fewer, or different operations performed in the same or a different order.

In one or more embodiments, process 500 simulates at least one of one or more interface lengths 160 between two fluids (for example, first fluid 110 and second fluid 120) and one or more interface volumes. In one or more embodiments, the process 500 may be used to simulate one or more well system fluids (for example, as shown in FIG. 2, wellbore servicing fluid 224, existing fluids 250, others, and any combination thereof). Here, the term "well system fluid" is used broadly to encompass a wide variety of fluids that may be found in or near, or may be used in connection with, a wellbore servicing system 200. Well system fluids may comprise one or more native fluids that reside in a subterranean region (for example, brine, oil, natural gas, any other native fluids, and any combination thereof), one or more fluids that have been or will be injected into a subterranean region (for example, one or more fracturing fluids, one or more treatment fluids, any other suitable fluid, and any combination thereof), one or more fluids that have been or will be communicated within a wellbore or within one or more tools installed in the wellbore (for example, drilling fluids, hydraulic fluids, any other suitable fluid, any combination thereof), one or more other types of well system fluids and any combination thereof. The process 500 may also simulate a plurality of types of well system fluids flowing within the same system. For example, process 500 may simulate a displacement operation wherein wellbore servicing fluid 224 displaces existing fluids 250 within a wellbore.

The process 500 may simulate well system fluid flow based on a model of fluid flow paths 219. For example, the process 500 may use the one or more one-dimensional models described with respect to FIGS. 6-9, or the process 500 may use another type of flow model. The model may comprise any one or more of one or more governing equations and one or more associated variables.

At 502, a wellbore geometry is identified. The wellbore geometry of wellbore 218 may comprise any combination of horizontal, vertical, slant, curved, or other wellbore orientations. Identifying the wellbore geometry may comprise generating a discretized representation of the one or more flow paths (for example, fluid flow path 219 in FIG. 2). Identifying the wellbore geometry may comprise identifying properties of the one or more flow paths or properties of wellbore 218 such as a length, a width, a geometry, one or more well system fluid compositions, one or more intersections, a pipe roughness, one or more other properties, and any combination thereof. For instance, in one or more embodiments, identifying a wellbore geometry comprises identifying the eccentric annular cross-sectional dimensions of the wellbore. Pipe rotation effects of the wellbore may also be considered within a given section of the annulus 228.

At 504, one or more initial parameters of the one or more well system fluids are determined. The one or more initial parameters may comprise one or more properties of the well system fluids in the fluid flow path 219, such as a pump rate, a volume, other properties, any combination thereof. The one or more initial parameters may comprise one or more characteristics of the well system fluids such as a density, a viscosity, or a miscibility at the beginning of displacement. Determining the one or more initial parameters may comprise determining any one or more of one or more fluid types, one or more fluid compositions, one or more fluid properties, other information, and any combination thereof. In one or more embodiments, each of the identified one or more well system fluids reside in a distinct domain along a flow path (for example, fluid flow path 219 in FIG. 2). In one or more embodiments, determining the initial parameters comprises evaluating sequential fluids in the displacement train.

At 520, one or more results for one or more properties are determined, wherein the properties are indicative of the composition of fluids in one or more mixing and channeling zones 130 in the fluid flow path 219 of wellbore 218. This determination may be obtained based on one or more empirical equations, one or more discretized governing flow equations, any other one or more equations, and any combination thereof. In one or more embodiments, any of the one or more equations are solved numerically, for example, using an iterative method such as Newton's method. The results may be indicative of one or more fluid properties such as a concentration, a velocity, a pressure, any other property, and any combination thereof. The results may be indicative of one or more properties of a mixing and channeling zone 130, such as at least one of the interface lengths 160 and the interface volumes, or the concentration of composite fluid 150. The results may also be indicative of one or more properties of well system fluid interaction, such as the location of the front of a displacing wellbore servicing fluid 224 in a displacement operation, the location of the interface volume in a displacement operation, other properties of well system fluids in a displacement operation, and any combination thereof. In one or more embodiments, the results also may be indicative of one or more compositions of a composite fluid in the fluid flow path at one or more depths of the wellbore and one or more intervals of time in a displacement operation, wherein the composite fluid comprises at least a portion of at least one or more of the first fluid and the second fluid. In one or more embodiments, one or more results may be recorded at one or more intervals of time during a displacement operation.

At 525, the result is checked for validity. For instance, in one or more embodiments, one or more properties of the composite fluid 150 can be validated by verifying the properties are within an expected range. In one or more embodiments, the properties may also be corroborated by existing data, such as data from surface sensors 258, data from downhole sensors 260, other results obtained using process 500, other data, any combination thereof. If the results are invalid, then the process continues to step 504.

At 530, the one or more results obtained from 520 may be used to modify a displacement operation if the results are valid at 525. For example, the results from step 520 for at least one of the interface length 160 and the interface volume may be considered to select one or more properties for one or more wellbore servicing fluids 224 in a displacement operation, such as a type, a chemistry, a volume, a concentration, any other physical property, any combination thereof. One or more aspects of the displacement operation (such as one or more pump rates, one or more pump schedules, one or more pipe rotations, other aspects, any combination thereof) may also be modified based on, at least in part, the results obtained from 520. Iterative methods such as Newton's method or optimization tools such as linear programming can be used to design a cost-effective displacement train. In one or more embodiments, the design is an automated process accomplished by using wellbore servicing fluid control subsystem 231, which may receive, generate or modify a pumping schedule or a selection of fluids in a displacement train. The design may be based on one or more simulations performed by the wellbore monitoring system 210 from FIG. 2 in real time during the displacement operation.

Figure 6:
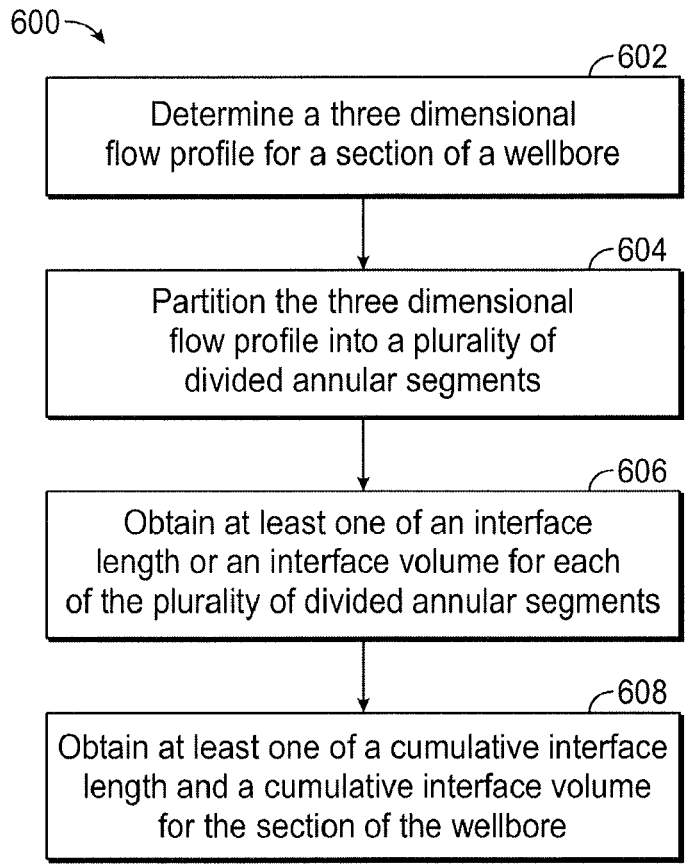
FIG. 6 is a flow chart for determining at least one of an interface length for a mixing and channeling zone and an interface volume of a composite fluid for a section of a wellbore, according to one or more aspects of the present disclosure.

FIG. 6 shows an example schematic diagram that demonstrates a process 600 used to determine at least one of an interface length 160 and an interface volume between a first fluid 110 and a second fluid 120 in a fluid flow path 219. In one or more embodiments, the first fluid 110 comprises wellbore servicing fluid 224 and the second fluid 120 comprises existing fluid 250 in the fluid flow path 219. In one or more embodiments, an information handling system 300, for example, wellbore monitoring system 210 shown in FIG. 2, may implement any one or more steps of process 600. The process 600, one or more individual operations of the process 600, or groups of operations may be iterated or performed in parallel, in series, or in another manner. In one or more embodiments, the process 600 may comprise the same, additional, fewer, or different operations performed in the same or a different order.

At step 602, a three dimensional flow profile is determined for one or more well system fluids flowing through a fluid flow path 219 (for example, a section of a wellbore 218). For example, the well system fluids may comprise first fluid 110 and second fluid 120 in a displacement operation, composite fluid 150, wellbore servicing fluids 124, other fluids flowing through any fluid flow path 219 in the wellbore, and any combination thereof. The three dimensional flow profile may comprise, among other things, a velocity profile, a thermal profile, a pressure profile, a shear stress profile, profiles for other fluid properties, and any combination thereof. Methods of obtaining the three dimensional flow profile are known to those of ordinary skill in the art and may comprise methods for both Newtonian and non-Newtonian flow. In one or more embodiments, the three dimensional flow profile may be determined using governing flow equations, such as, for example, the Navier-Stokes equation, one or more related approximations of the Navier-Stokes equation, one or more diffusion-convection equations, one or more conservation equations, one or more continuity equations, any other one or more equations, and any combination thereof. The three dimensional flow profile may also be determined using one or more analytical models for non-Newtonian flow, such as the Herschel-Bulkley model, Power Law model, Bingham Plastic model, any one or more other analytical models, and any combination thereof. In one or more embodiments, the three dimensional flow profile may also be determined applying numerical methods, for instance, by solving the Navier-Stokes equations with shear-rate dependent viscosity for non-Newtonian flow. In one or more embodiments, step 602 may be implemented by the annular flow mixing module 440 and the solver module 442, as shown in FIG. 4.

Figure 7:
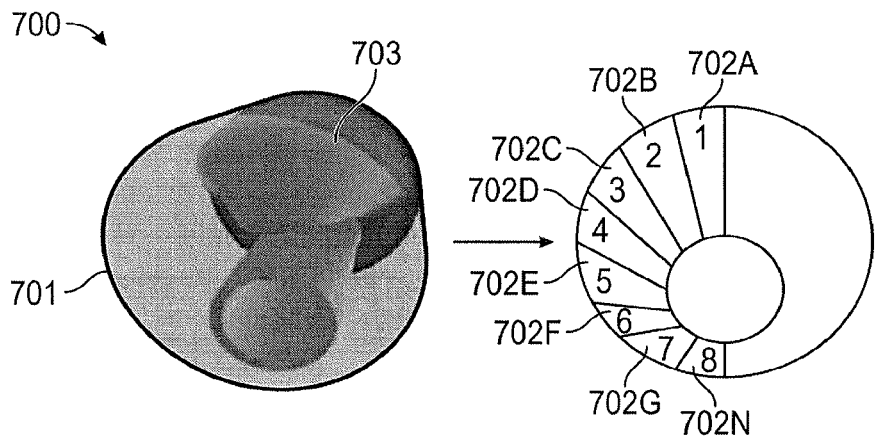
FIG. 7 is a diagram illustrating partitioning an annular wellbore into divided annular segments, according to one or more aspects of the present disclosure.
Figure 8:
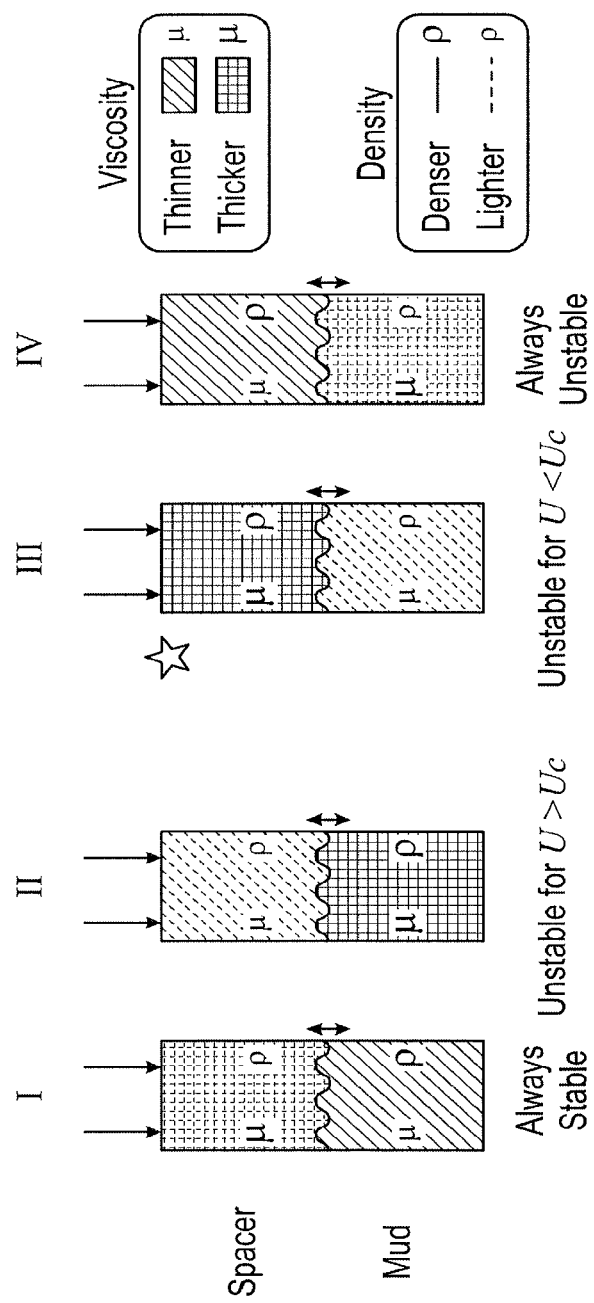
FIG. 8 is a diagram showing interface stability rules used to account for channeling effects in a pipeline, according to one or more aspects of the present disclosure.

At step 604, to account for any eccentricity of the wellbore 218, the three dimensional flow profile from step 602 may be partitioned into a plurality of divided annular segments. FIG. 7 illustrates a three dimensional flow profile 703 of a wellbore section 701 that is partitioned by dividing the cross section of the wellbore section 701, according to one or more embodiments of the present disclosure. Applying step 604 results in divided annular segments 702A-702N (collectively, divided annular segments 702), where "N" is any number of divided annular segments 702. One or more analytical methods for pipeline flow may be used for each of the divided annular segments 702 by approximating each divided annular segment 702A-702N as a pipe with a hydraulic diameter. For example, a velocity for each divided annular segment 702A-702N may be determined by determining an average velocity of a respective segment of the three dimensional flow profile 703. In one or more embodiments, each cross sectional area associated with each of the plurality of divided annular segments 602A-602N is substantially equal. In one or more embodiments, each cross sectional area associated with each of the plurality of divided annular segments 702A-702N is substantially equal.

At step 606, at least one of an interface length 160 and an interface volume is obtained for each of the plurality of divided annular segments 702N. For instance, the interface length 160 may be obtained using one or more empirical models, such as the Austin Palfrey (1964) empirical model for pipeline flow mixing. The empirical models may be implemented into the annular flow mixing module 440 and solved using solver 442 from FIG. 3. One or more first initial parameters of the first fluid 110 and one or more second initial parameters of the second fluid 120, before the displacement operation is performed, may be used as one or more first inputs and one or more second inputs, respectively, in the one or more empirical models.

The empirical model may comprise one or more of example Equations (1)-(6). Example Equations (1)-(6) are applied to each divided annular segment 702A-702N to calculate an interface length 160 for each divided annular segment 702A-702N. Equations (1)-(2) may be used to describe an interface length 160 for the laminar and turbulent regimes of flow. Equation (3) is used to calculate the critical Reynolds number to determine whether the flow is in the laminar or turbulent regime.

$$S_{laminar} = 18420 \times \sqrt{dL} \times Re_m^{-0.09} e^{1.21\sqrt{d}} \quad \text{(Equation 1)}$$

$$S_{turbulent} = 18420 \times \sqrt{dL} \times Re_m^{-0.09} e^{1.21\sqrt{d}} \quad \text{(Equation 2)}$$

$$Re_{crit} = 10000 e^{1.52\sqrt{d}} \quad \text{(Equation 3)}$$

In equations (1)-(3), d is an effective diameter of a divided annular segment 702N and L is a length of a divided annular segment 702N. Reynolds number $Re_m$ is calculated for the composite fluid 150, for example, using the equation:

$$Re_{composite} = \frac{d \times U}{v_{composite}} \quad \text{(Equation 4)}$$

where U is the average flow velocity in a divided annular segment 702N and $v_{composite}$ is the kinematic viscosity of the composite fluid using a 50%/50% composition of first fluid 110 and second fluid 120, obtained through Gambill's equation (1959):

$$v_m^{1/3} = x_1 v_1^{1/3} + x_2 v_2^{1/3} \quad \text{(Equation 5)}$$

In Equation (5), $x_1$ and $x_2$ are the mass fraction and $v_1$ and $v_2$ are the kinematic viscosity for the first fluid 110 and second fluid 120, respectively. The kinematic viscosities associated with the first fluid 110 and the second fluid 120 are calculated using one or more densities and one or more apparent viscosities of first fluid 110 and one or more apparent viscosities of the second fluid 120, respectively, estimated at one or more downhole pressures, one or more downhole temperatures, and one or more shear rates.

One or more pipe rotation effects may be considered when estimating an experienced shear rate in the annulus 228, as well as a distance traveled by each of the first fluid 110 and the second fluid 120 and the velocity of each of the first fluid 110 and the second fluid 120 within a given divided annular segment 702. One or more channeling effects may be incorporated in Equation (4) by modifying the fluid velocity term, U, according to one or more interface stability rules in FIG. 8 and the Taylor-Rayleigh equation, described below:

$$U_c = \sqrt{A \times g \times \cos(\text{inclination}) \times \text{Interfacialarea}} \quad \text{(Equation 6)}$$

In Equation (6), g is a gravitational constant and A is a modified Attwood number. In one or more embodiments where the interface of first fluid 110 and second fluid 120 is deemed to be unstable according to the interface stability rules, the flow velocity, U, of Equation (4) is modified to consider the channeling velocity, $U_c$.

At step 608, at least one of a cumulative interface length and a cumulative interface volume for the wellbore section 701 may be determined. The cumulative interface length may be determined, in one or more embodiments, by averaging the one or more interface lengths 160 for each of the plurality of divided annular segments 702 from step 606 for a cumulative mixing and channeling zone. The cumulative interface volume may be determined by combining the one or more interface volumes for each of the plurality of divided annular segments 702. In one or more embodiments, the cumulative interface length may be obtained by determining a measure of central tendency for the individual lengths of mixing and channeling, such as an arithmetic mean, weighted mean, or any other measure of central tendency. For instance, the cumulative interface length calculated by an arithmetic mean is given by:

$$S_{cumulative} = \frac{\sum_i^N S_i}{N} \quad \text{(Equation 7)}$$

where $S_{cumulative}$ is the cumulative interface length for the wellbore section 701, $S_i$ is the interface length for each of the plurality of divided annular segments 702 calculated at step 606, and N is the number of divided annular segments 702.

Figure 9:
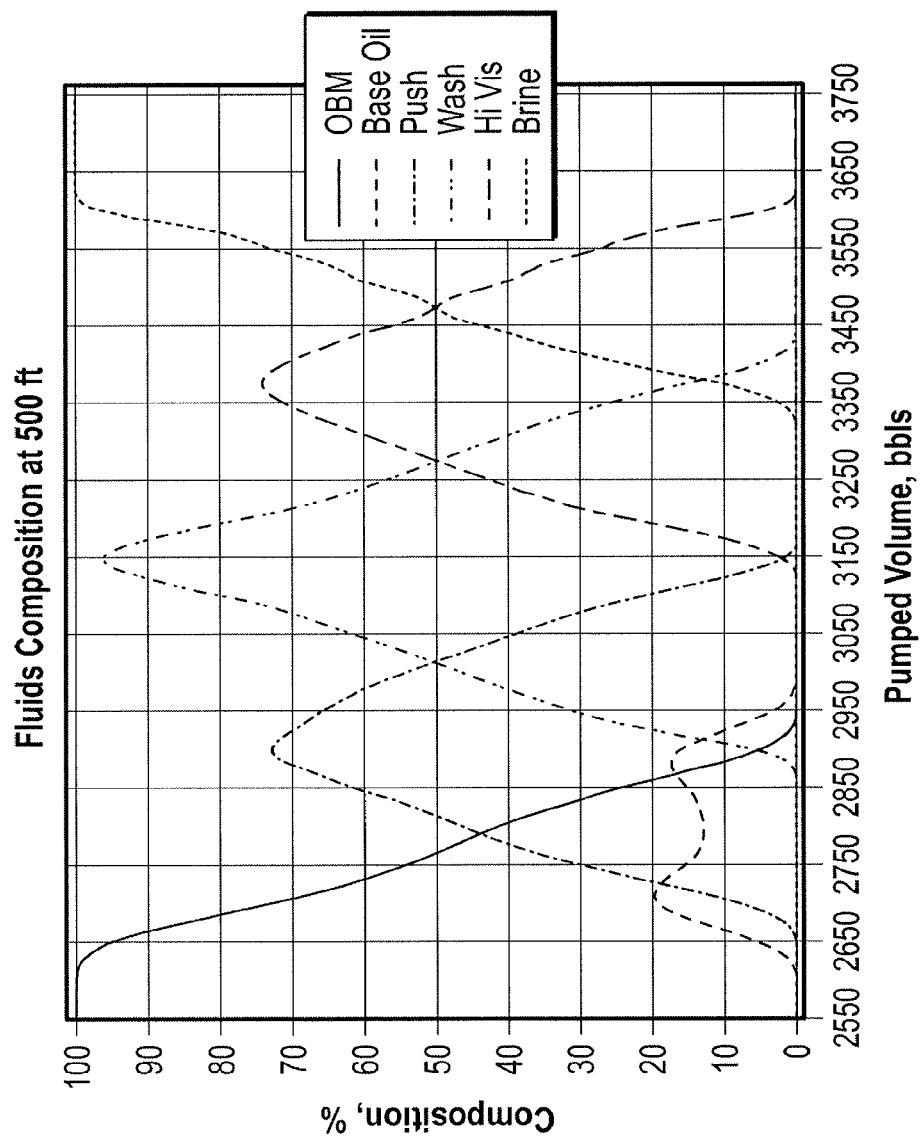
FIG. 9 is a graph illustrating the computed composition of fluids at a depth in the wellbore at a plurality of intervals during a displacement operation, according to one or more aspects of the present disclosure.

FIG. 9 is a graph illustrating the computed composition of fluids at a depth of 500 feet (ft.) (approximately 152.40 meters) in the wellbore during a simulated displacement operation, according to one or more aspects of the present disclosure. In one or more embodiments, the displacement train simulated in FIG. 9 circulates a plurality of wellbore servicing fluids 224 in the following sequence: Oil-Based Mud ("OBM"), Base Oil, Push Pill, Wash Pill, High Viscosity ("Hi Vis") Pill, and Brine. Since a unique interface exists between any two wellbore servicing fluids 224 in the sequence, process 600 is used for each pair of fluids. Specifically, in FIG. 9, five cumulative interface lengths using process 600 were calculated for the following five interfaces: (1) Base Oil displacing OBM, (2) Push Pill displacing Base Oil, (3) Wash Pill displacing Push Pill, (4) Hi Vis Pill displacing Wash Pill, and (5) Brine displacing Hi Vis Pill.

The calculated cumulative interface lengths were used to simulate the locations of composite fluids formed by each one of the five interfaces throughout the simulated displacement operation. For example, the cumulative interface lengths are used to determine that OBM, Base Oil, Push Pill, and the respective interfaces coexist at a depth of 500 ft. (152.40 meters) in the wellbore after 2800 barrels (bbls) (approximately 445 kiloliters) of wellbore servicing fluids 224 have been circulated in the displacement operation. FIG. 9 was plotted by recording the locations of each one of the five interfaces and the locations of wellbore servicing fluids 224 in the displacement train at a plurality of intervals of time. Note that at any point of time in the displacement operation, the concentration of wellbore servicing fluids in FIG. 9 adds to 100% (for example, 42% OBM, 46% Push Pill, and 12% Base Oil adds to 100% approximately 445 kiloliters pumped).

In one or more embodiments, a method for fluid displacement in a wellbore comprises flowing a first fluid and a second fluid through a fluid flow path of the wellbore, determining one or more three dimensional flow profiles in the fluid flow path, generating one or more outputs from a model for an interface volume based, at least in part, on the first fluid and the second fluid, the model comprising dividing the one or more three dimensional flow profiles into a plurality of divided annular segments, and for each of the plurality of divided annular segments, determining at least one of an interface length of a mixing and channeling zone and the interface volume between the first fluid and the second fluid, determining at least one of a cumulative interface length of a cumulative mixing and channeling zone and a cumulative interface volume for the one or more three dimensional flow profiles based on at least one of the one or more outputs from the model, and modifying a displacement operation based, at least in part, on at least one of the cumulative interface length and the cumulative interface volume. In one or more embodiments, each cross sectional area associated with each of the plurality of divided annular segments is substantially equal. In one or more embodiments, determining the at least one of the interface length and the interface volume for each of the plurality of divided annular segments comprises determining a Reynolds Number for a mixture comprising the first fluid and the second fluid. In one or more embodiments, determining the interface length comprises determining a modified channeling velocity for each of the plurality of divided annular segments, based on a geometry of the fluid flow path and an interfacial area, wherein the interfacial area is the area of contact between the one or more three dimensional flow profiles and the wellbore. In one or more embodiments, the displacement operation is modified in real time based, at least in part, on the at least one of the cumulative interface length and the cumulative interface volume. In one or more embodiments, the method further comprises recording one or more locations and one or more sizes of the interface volume at one or more intervals of time during a displacement operation. In one or more embodiments, the method further comprises determining one or more compositions of a composite fluid in the fluid flow path at one or more depths of the wellbore and one or more intervals of time in a displacement operation, wherein the composite fluid comprises at least a portion of at least one or more of the first fluid and the second fluid.

In one or more embodiments, a non-transitory computer-readable medium stores one or more instructions that, when executed by a processor, cause the processor to receive data associated with a first fluid and a second fluid flowing through a fluid flow path of the wellbore, determine one or more three dimensional flow profiles in the fluid flow path, generate a model for an interface volume based, at least in part, on the first fluid and the second fluid, the model comprising dividing the one or more three dimensional flow profiles into a plurality of divided annular segments, and for each of the plurality of divided annular segments, determining at least one of an interface length of a mixing and channeling zone and the interface volume between the first fluid and the second fluid, determine at least one of a cumulative interface length of a cumulative mixing and channeling zone and a cumulative interface volume for the one or more three dimensional flow profiles based on at least one of the one or more outputs from the model, and modify a displacement operation based, at least in part, on at least one of the cumulative interface length and the cumulative interface volume. In one or more embodiments, each cross sectional area associated with each of the plurality of divided annular segments is substantially equal. In one or more embodiments, determining the at least one of the interface length and the interface volume for each of the plurality of divided annular segments comprises determining a Reynolds Number for a mixture comprising the first fluid and the second fluid. In one or more embodiments, determining the interface length comprises determining a modified channeling velocity for each of the plurality of divided annular segments, based on a geometry of the fluid flow path and an interfacial area, wherein the interfacial area is the area of contact between the one or more three dimensional flow profiles and the wellbore. In one or more embodiments, the one or more instructions when executed by the processor comprises modifying the displacement operation in real time based, at least in part, on the at least one of the cumulative interface length and the cumulative interface volume. In one or more embodiments, the one or more instructions when executed by the processor further cause the processor to record one or more locations and one or more sizes of the interface volume at one or more intervals of time during a displacement operation. In one or more embodiments, the one or more instructions when executed by the processor further comprises determining one or more compositions of a composite fluid in the fluid flow path at one or more depths of the wellbore and one or more intervals of time in a displacement operation, wherein the composite fluid comprises at least a portion of at least one or more of the first fluid and the second fluid.

In one or more embodiments, an information handling system comprises a memory and a processor coupled to the memory, wherein the memory comprises one or more instructions executable by the processor to receive data associated with a first fluid and a second fluid flowing through a fluid flow path of the wellbore, determine one or more three dimensional flow profiles in the fluid flow path, generate a model for an interface volume based, at least in part, on the first fluid and the second fluid, the model comprising dividing the one or more three dimensional flow profiles into a plurality of divided annular segments and for each of the plurality of divided annular segments, determining at least one of an interface length of a mixing and channeling zone and the interface volume between the first fluid and the second fluid, determine at least one of a cumulative interface length of a cumulative mixing and channeling zone and a cumulative interface volume for the one or more three dimensional flow profiles based on at least one of the one or more outputs from the model, and modify a displacement operation based, at least in part, on at least one of the cumulative interface length and the cumulative interface volume. In one or more embodiments, each cross sectional area associated with each of the plurality of divided annular segments is substantially equal. In one or more embodiments, determining the at least one of the interface length and the interface volume for each of the plurality of divided annular segments comprises determining a Reynolds Number for a mixture comprising the first fluid and the second fluid. In one or more embodiments, the one or more instructions when executed by the processor comprises modifying the displacement operation in real time based, at least in part, on the at least one of the cumulative interface length and the cumulative interface volume. In one or more embodiments, the one or more instructions are further executable by the processor to record one or more locations and one or more sizes of the interface volume at one or more intervals of time during a displacement operation. In one or more embodiments, the one or more instructions are further executable by the processor to determine one or more compositions of a composite fluid in the flow path of the wellbore servicing system at one or more depths of the wellbore and one or more intervals of time in a displacement operation, wherein the composite fluid comprises at least a portion of at least one or more of the first fluid and the second fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

A number of examples have been described. Nevertheless, it will be understood that various modifications can be made. Accordingly, other implementations are within the scope of the following claims.

What is claimed is:

1. A method for fluid displacement in a wellbore comprising:
flowing a first fluid and a second fluid through a fluid flow path of the wellbore;
determining one or more three dimensional flow profiles in the fluid flow path;
generating one or more outputs from a model for an interface volume based, at least in part, on the first fluid and the second fluid, the model comprising:
dividing the one or more three dimensional flow profiles into a plurality of divided annular segments; and
for each of the plurality of divided annular segments, determining at least one of an interface length of a mixing and channeling zone and the interface volume between the first fluid and the second fluid;
determining at least one of a cumulative interface length of a cumulative mixing and channeling zone and a cumulative interface volume for the one or more three dimensional flow profiles based on at least one of the one or more outputs from the model; and
modifying a displacement operation based, at least in part, on at least one of the cumulative interface length and the cumulative interface volume.

2. The method of claim 1, wherein each cross sectional area associated with each of the plurality of divided annular segments is substantially equal.

3. The method of claim 1, wherein determining the at least one of the interface length and the interface volume for each of the plurality of divided annular segments comprises determining a Reynolds Number for a mixture comprising the first fluid and the second fluid.

4. The method of claim 1, wherein determining the interface length comprises determining a modified channeling velocity for each of the plurality of divided annular segments, based on a geometry of the fluid flow path and an interfacial area, wherein the interfacial area is the area of contact between the one or more three dimensional flow profiles and the wellbore.

5. The method of claim 1, wherein the displacement operation is modified in real time based, at least in part, on the at least one of the cumulative interface length and the cumulative interface volume.

6. The method of claim 1, further comprising recording one or more locations and one or more sizes of the interface volume at one or more intervals of time during a displacement operation.

7. The method of claim 1, further comprising determining one or more compositions of a composite fluid in the fluid flow path at one or more depths of the wellbore and one or more intervals of time in a displacement operation, wherein the composite fluid comprises at least a portion of at least one or more of the first fluid and the second fluid.

8. A non-transitory computer-readable medium storing one or more instructions that, when executed by a processor, cause the processor to:
receive data associated with a first fluid and a second fluid flowing through a fluid flow path of the wellbore;
determine one or more three dimensional flow profiles in the fluid flow path;
generate one or more outputs from a model for an interface volume based, at least in part, on the first fluid and the second fluid, the model comprising:
dividing the one or more three dimensional flow profiles into a plurality of divided annular segments; and
for each of the plurality of divided annular segments, determining at least one of an interface length of a mixing and channeling zone and the interface volume between the first fluid and the second fluid;
determine at least one of a cumulative interface length of a cumulative mixing and channeling zone and a cumulative interface volume for the one or more three dimensional flow profiles based on at least one of the one or more outputs from the model; and
modify a displacement operation based, at least in part, on at least one of the cumulative interface length and the cumulative interface volume.

9. The computer readable medium of claim 8, wherein each cross sectional area associated with each of the plurality of divided annular segments is substantially equal.

10. The computer readable medium of claim 8, wherein determining the at least one of the interface length and the interface volume for each of the plurality of divided annular segments comprises determining a Reynolds Number for a mixture comprising the first fluid and the second fluid.

11. The computer readable medium of claim 8, determining the interface length comprises determining a modified channeling velocity for each of the plurality of divided annular segments, based on a geometry of the fluid flow path and an interfacial area, wherein the interfacial area is the area of contact between the one or more three dimensional flow profiles and the wellbore.

12. The computer readable medium of claim 8, wherein the one or more instructions when executed by the processor comprises modifying the displacement operation in real time based, at least in part, on the at least one of the cumulative interface length and the cumulative interface volume.

13. The computer readable medium of claim 8, wherein the one or more instructions when executed by the processor further cause the processor to record one or more locations and one or more sizes of the interface volume at one or more intervals of time during a displacement operation.

14. The computer readable medium of claim 8, wherein the one or more instructions when executed by the processor further comprises determining one or more compositions of a composite fluid in the fluid flow path at one or more depths of the wellbore and one or more intervals of time in a displacement operation, wherein the composite fluid comprises at least a portion of at least one or more of the first fluid and the second fluid.

15. An information handling system comprising:
a memory;
a processor coupled to the memory, wherein the memory comprises one or more instructions executable by the processor to:
receive data associated with a first fluid and a second fluid flowing through a fluid flow path of the wellbore;
determine one or more three dimensional flow profiles in the fluid flow path;
generate one or more outputs from a model for an interface volume based, at least in part, on the first fluid and the second fluid, the model comprising:
dividing the one or more three dimensional flow profiles into a plurality of divided annular segments; and
for each of the plurality of divided annular segments, determining at least one of an interface length of a mixing and channeling zone and the interface volume between the first fluid and the second fluid;

determine at least one of a cumulative interface length of a cumulative mixing and channeling zone and a cumulative interface volume for the one or more three dimensional flow profiles based on at least one of the one or more outputs from the model; and modify a displacement operation based, at least in part, on at least one of the cumulative interface length and the cumulative interface volume.

16. The information handling system of claim 15, wherein each cross sectional area associated with each of the plurality of divided annular segments is substantially equal.

17. The information handling system of claim 15, wherein determining the at least one of the interface length and the interface volume for each of the plurality of divided annular segments comprises determining a Reynolds Number for a mixture comprising the first fluid and the second fluid.

18. The information handling system of claim 15, wherein the one or more instructions when executed by the processor comprises modifying the displacement operation in real time based, at least in part, on the at least one of the cumulative interface length and the cumulative interface volume.

19. The information handling system of claim 15, wherein the one or more instructions are further executable by the processor to record one or more locations and one or more sizes of the interface volume at one or more intervals of time during a displacement operation.

20. The information handling system of claim 15, wherein the one or more instructions are further executable by the processor to determine one or more compositions of a composite fluid in the flow path of the wellbore servicing system at one or more depths of the wellbore and one or more intervals of time in a displacement operation, wherein the composite fluid comprises at least a portion of at least one or more of the first fluid and the second fluid.

* * * * *